United States Patent [19]

Rose

[11] 4,269,356
[45] May 26, 1981

[54] PORTABLE AGRICULTURAL SPRAYER

[76] Inventor: Donald D. Rose, 412 Breezy La., Wharton, Tex. 77488

[21] Appl. No.: 971,680

[22] Filed: Dec. 21, 1978

[51] Int. Cl.³ .............................................. B05B 1/20
[52] U.S. Cl. ................................... 239/167; 239/170; 239/176; 248/70
[58] Field of Search ............... 239/146, 159, 164, 166, 239/167, 169, 170, 176, 286, 373; 222/373, 612, 626; 248/70

[56] References Cited

U.S. PATENT DOCUMENTS

| | | | |
|---|---|---|---|
| 912,966 | 2/1909 | Lamiell et al. | 239/167 |
| 2,211,519 | 8/1940 | Simmons | 239/169X |
| 2,514,441 | 7/1950 | Brown | 222/626 X |
| 2,804,259 | 8/1957 | Ralston | 239/373 X |

Primary Examiner—Andres Kashnikow
Attorney, Agent, or Firm—Neal J. Mosely

[57] ABSTRACT

A portable agricultural sprayer comprises a narrow elongated wheeled frame having the wheels closely spaced to permit operation between rows of plants. The frame is provided with a handle for hand-moving. The frame supports an electrically operated compressor as a source of compressed air and an electric storage battery for providing power for operation of the compressor. A storage tank is supported on the frame for containing a solution of agricultural chemicals or fertilizer or the like and is connected at one end to the output side of the compressor to be provided with compressed air for pumping the liquid to be sprayed. The other end of the storage tank is connected to valved connections to the outlet end of a pair of swivelled booms which carry adjustable nozzles for spraying agricultural chemical solutions. The booms are supported for angular movement and are provided with a suitable locking device to support the booms in a horizontal position or in a vertical position or any intermediate position. In addition, the support for the swivelled booms is adjustably supported on the wheeled frame for vertical movement.

5 Claims, 5 Drawing Figures

PORTABLE AGRICULTURAL SPRAYER

BACKGROUND OF THE INVENTION

1. Field of the Invention

This invention relates to portable, wheeled, hand-moved agricultural sprayers.

2. Brief Description of the Prior Art

Large size agricultural spraying equipment which is tractor-driven or self-propelled is well known in the art. Small, hand-carried sprayers are also well known. The prior art, however, does not disclose small, wheeled, hand-pushed agricultural sprayers which are suitable for use in home gardens and small farms which do not require power driven equipment.

Kang U.S. Pat. No. 2,301,213 discloses a tractor-driven agricultural sprayer having horizontally adjustable spray heads.

Essick U.S. Pat. No. 2,596,473 discloses a tractor-carried sprayer in which the spray equipment is fixed in a predetermined position at the back of the tractor and the agricultural chemicals are sprayed from a tank by a pump operated by the tractor engine.

Pinke U.S. Pat. No. 2,602,684 discloses a spring operated hinge connection for a spray boom on a tractor driven agricultural sprayer.

Knoell U.S. Pat. No. 3,023,970 discloses a tractor-carried agricultural sprayer having spray booms which may be pivoted between horizontal and vertical positions.

Logan U.S. Pat. No. 4,089,446 discloses a wheeled water-supply tank having a hydraulic pump and low-voltage electric motor for operating the same carried on said tank.

SUMMARY OF THE INVENTION

A portable agricultural sprayer comprises a narrow elongated wheeled frame having the wheels closely spaced to permit operation between rows of plants. The frame is provided with a handle for hand pushing. The frame supports an electrically operated compressor as a source of compressed air and an electric storage battery for providing power for operation of said compressor. A storage tank is supported on the frame for containing a solution of agricultural chemicals or fertilizer of the like and is connected at one end to the output side of said compressor to be provided with compressed air for pumping the liquid to be sprayed. The other end of the storage tank is connected to valved connections to the outlet end of a pair of swivelled booms which carry adjustable nozzles for spraying agricultural chemical solutions. The booms are supported for angular movement and are provided with a suitable locking means to support said booms in a horizontal position or in a vertical position or any intermediate positon. In addition, the means supporting said swivelled booms is adjustably supported on said wheeled frame for vertical movement.

DESCRIPTION OF THE PREFERRED EMBODIMENT

Figure 1:
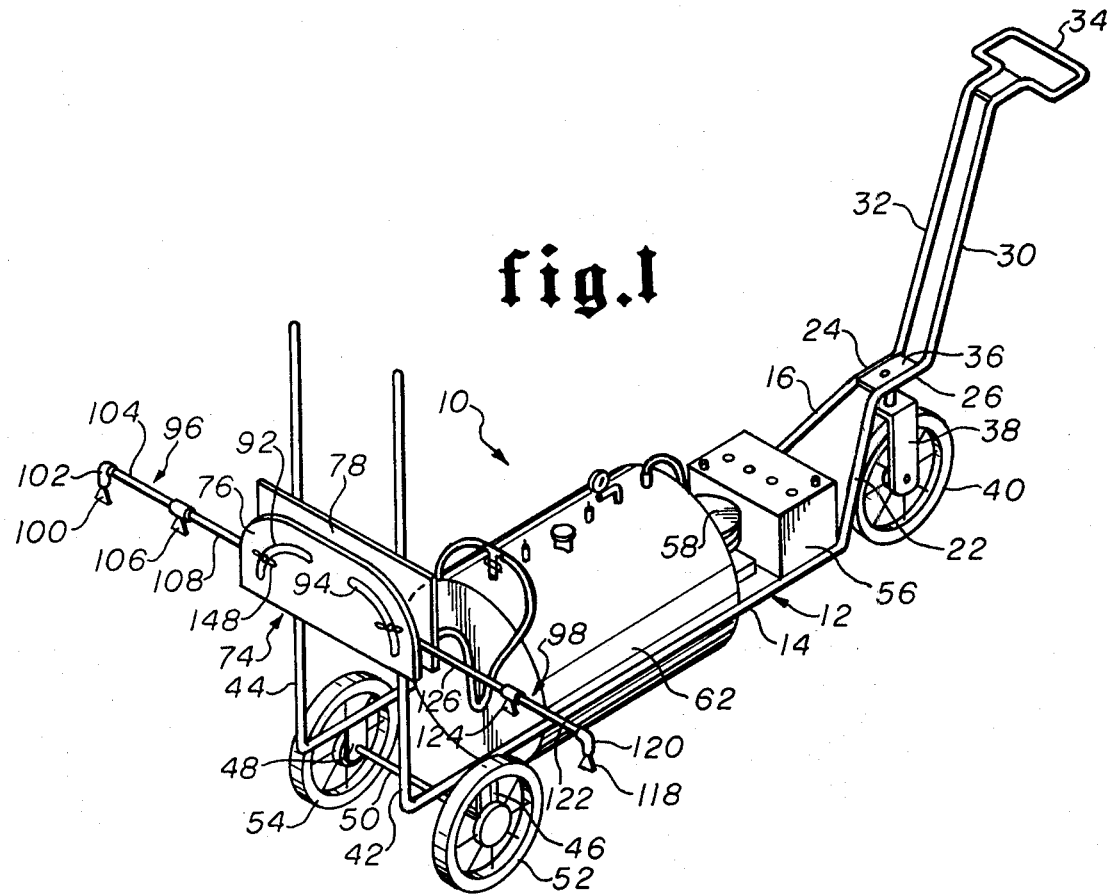
FIG. 1 is an isometric view looking from the front of a portable, wheeled sprayer which is a preferred embodiment of this invention.
Figure 2:
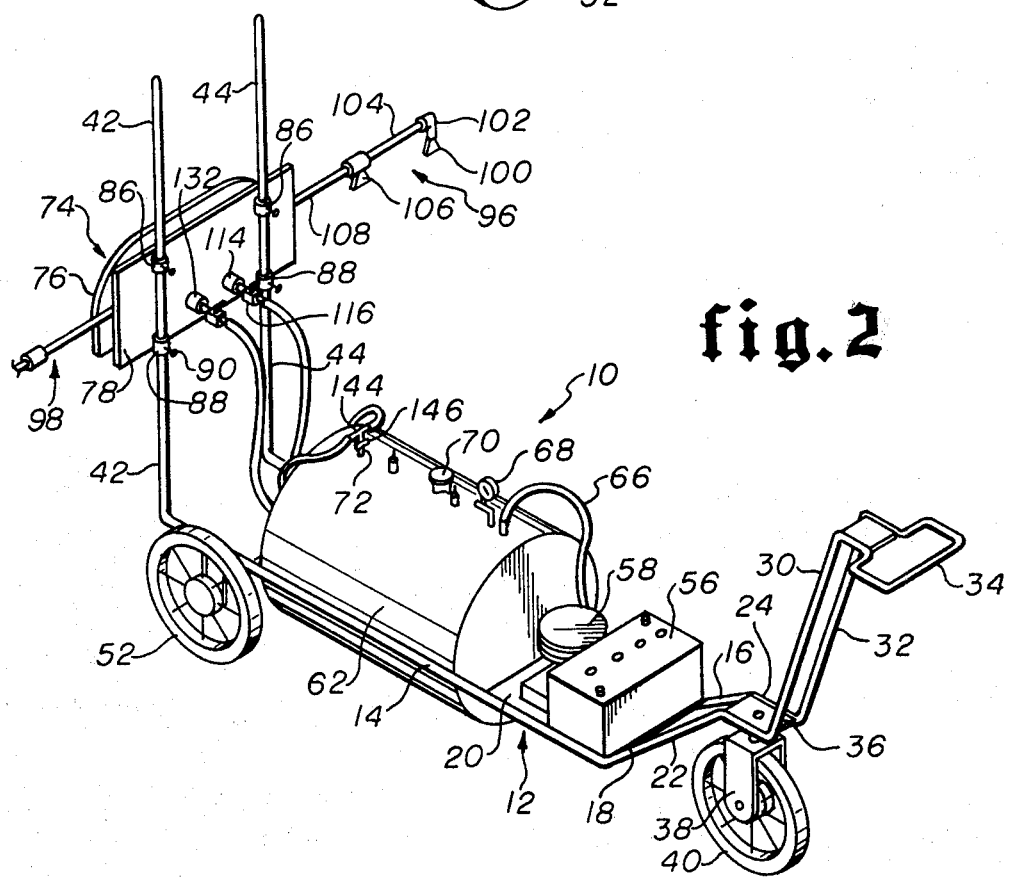
FIG. 2 is an isometric view looking from the rear of the sprayer shown in FIG. 1.

Referring to the drawing by numerals of reference, and particularly to FIGS. 1 and 2, there is shown a portable agricultural sprayer 10 having a framework, generally designated 12, of tubular steel (or other suitable metal). Framework 12 has tubular portions 14 and 16 which are spaced generally parallel to each other and connected by laterally extending supports 18 and 20. Tubular members 14 and 16 are bent upwards as indicated at 22 and 24, outward as indicated at 26 and 28 and upward again as indicated at 30 and 32. At the upper end of portions 30 and 32 the tubular members are joined to form a handle 34. Tubular portions 26 and 28 are joined by a plate member 36 in which there is pivotally supported a supporting fork 38 for wheel 40. The wheel 40 and fork 38 may pivot for steering motion of the frame during operation.

At the front end of supporting frame 12, tubular supports 14 and 16 are bent upward as indicated at 42 and 44. Also, at the front end of the frame there are provided supports 46 and 48 which receive and support axle 50 for wheels 52 and 54.

At the rear portion of the frame 12, a storage battery 56 is supported on support member 18 and is connected to an electric motor driven compressor 58 which provides a source of compressed air. Switches and controls for the apparatus are provided but not shown.

Toward the front end of supporting frame 12, there is provided a cylindrical tank 62 which is held in place by metal straps. Compressor 58 is connected by flexible tubing 66 leading to storage tank 62. Compressor 58 provides a source of compressed air for pressurizing the contents of tank 62 to spray said contents during operation of the apparatus. Tank 62 is provided with a pressure gage and relief valve 68, filler opening 70 and outlet tube 72.

Figure 3:
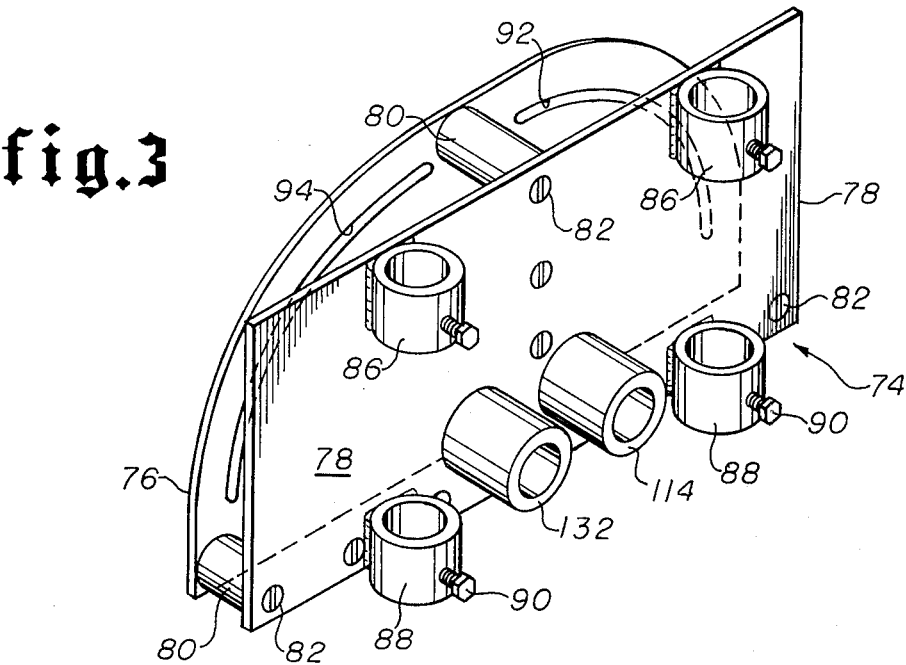
FIG. 3 is an isometric view of the rear side of the supporting structure for the spray booms of the sprayer shown in FIGS. 1 and 2.
Figure 4:
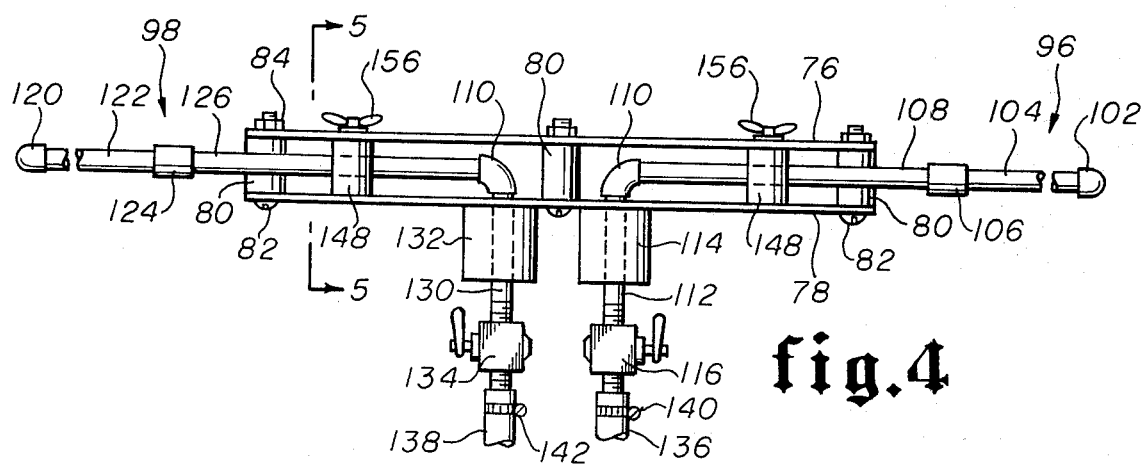
FIG. 4 is a top view of the support for the spray booms of the sprayer shown in FIGS. 1 and 2.

At the front end of the apparatus, there is provided a boom support 74 which is shown in more detail in FIGS. 3 and 4. Boom support 74 consists of a pair of flat parallel plates 76 and 78. Plate 78 is rectangular in shape while plate 76 has an arcuate upper portion. Plates 76 and 78 are separated by a plurality of spacers 80 and are secured together by bolts 82 and nuts 84, or like fastening devices. Plate 78 has a pair of tubular supporting guides 86 supported on the upper end thereof and a pair of tubular guides 88 with threaded clamps 90 positioned at the lower end thereof. In FIG. 2, it is seen that vertically extending supporting tube 42 extends through one of the tubular guides 86 and one of the guides 88 while vertical tubular support 44 extends through the other tubular guide 86 and tubular guide 88. The clamps 90 are adjustable to clamp against vertical tubular support 42 and 44 and provide for vertical adjustment of the boom support 74.

Boom support 74 provides both the support and adjusting mechanism for a pair of spray booms 96 and 98. Spray boom 96 consists of spray head 100 supported on elbow 102 which in turn is supported on spray tube 104. Spray head 106 is connected on one side to tube 104 and on the other side to tube 108. Tube 108 is connected to elbow 110 which is, in turn, connected to tube 112 which extends through and is guided for support in pipe 114 secured on boom support plate 76. Tube 112 is provided with a shut off valve 116.

Spray boom 98 is identical to boom 96 and consists of spray head 118 supported on elbow 120 which, in turn, is supported on tube 122. Spray head 124 is connected on one side to tube 122 and on the other side to tube 126. Tube 126 is connected to elbow 128 which is connected to tube 130. Tube 130 extends through and is guided in pipe 132 which is secured to and supported on plate 78. Tube 130 is provided with shut off valve 134 at its inner end. Shut off valves 116 and 134 are connected by flexible rubber hose 136 and 138, respectfully, secured in place by clamps 140 and 142. The other ends of hoses 136 are connected to the ends of a tee connection 144 which is secured in a quick disconnect fitting 146 on outlet tube 72. Quick disconnect fitting 146 is provided with an internal check valve which is closed when the tee connection is removed from the fitting. This arrangement permits removal of the connecting hoses while simultaneously shutting off the flow of liquid from tank 62.

Figure 5:
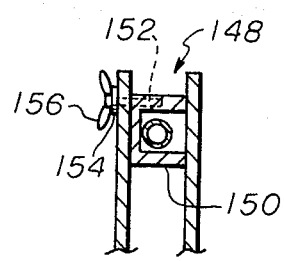
FIG. 5 is a detail view of one of the clamps for supporting the spray booms in any selected location.

Boom support 74 is provided with adjustable supporting members 148 which are shown in detail in FIG. 5. The supporting members consist of a short channel section 150 which straddles tube 108 or tube 126. Channel portion 150 has a threaded stem portion 152 and washer 154 and wing nut 156. Boom support plate member 76 has a pair of arcuate slots 92 and 94 in which the threaded stems 152 are positioned. Washer 154 and wing nut 156 are positioned outside plate member 76 for tightening to secure support member 148 in any predetermined position.

OPERATION

The operation of this apparatus should be fairly apparent from the description of the component parts and methods of assembly. However, a more detailed description of operation will be set forth for clarification.

The apparatus described above is designed for spraying agricultural chemicals, including fertilizer, herbicides, pesticides, etc., in gardens and small farms. The apparatus is designed for use in a small space in relatively narrow rows where a tractor can not be conveniently operated. The tubular frame is of a light weight construction and is pushed by the operator by means of handle 34. The wheels 40, 52 and 54 are preferably 10 inches in diameter. Wheel 40 swivels for turning movement of the apparatus, as previously described. The tubular support portions of the frame are preferably spaced 10 inches apart on center to center measurement at the front end of the apparatus. The vertically extending support tubes 42 and 44 are preferably 10 inches apart and 36 inches high. Boom support 74 may therefor be adjusted by releasing and tightening clamps 90 which allow the boom support to be moved vertically along supporting tubes 42 and 44.

Spray boom arms 96 and 98 may be pivoted between a horizontal position, as shown in FIGS. 1 and 2, and a vertical position, as limited by the upper end of slots 92 and 94 in plate 76. Adjustable clamps 148 which support tubes 108 and 126 may be adjusted by releasing or tightening wing nuts 156 and may be clamped in any selected position in arcuate slots 92 and 94 to hold spray boom arms 96 and 98 in any selected position.

The apparatus is completely portable and hand-moved. It rolls freely on wheels 40, 52 and 54 and is easily turned. Compressor 58 is operated by battery 56. Battery 56 is preferably a long life storage battery capable of operating the equipment for a period of time up to about 4 hours before recharging. Compressor 58 supplies storage tank 62 with compressed air and will pressurize the tank to any selected pressure. Tank 62 is filled through opening 70 with a solution of fertilizer, herbicide, or pesticide, which is to be sprayed. The individual spray heads 100, 106, 118 and 124 are of a universally adjustable type and may be set to spray in any selected position relative to the spray boom arms. Spray boom arms 96 and 98 may be set to any position ranging from horizontal, as shown in FIGS. 1 and 2, to the vertical or any intermediate position. The equipment is quite flexible in that the spray heads are individually adjustable and the spray arms are angularly adjustable and the spray boom support 74 is vertically adjustable.

The apparatus, as described above, is light and easy to operate. It is self-contained and has its own power supply. It is fully portable on its wheeled supports. The equipment may be turned on and off readily by a simple on-off switch for the electric energized compressor 58. The wide range of adjustability of the individual spray heads, spray boom arms 96 and 98, and vertical adjustability of spray boom support 74 permits use of the equipment in a wide variety of applications. The spray boom support may be adjusted in height to accomodate tall plants. Also, either or both of the spray boom arms 96 and 98 may be raised to a fully vertical position to spray sideways into tall plants. Individual shut off valves 116 and 134 permit the apparatus to be used for selective spraying to one side or the other. The apparatus is normally moved down the middle of two rows and will spray two rows simultaneously. The equipment may also be used for spraying a continuous path, up to 48 inches wide, for treatment of lawns.

While this apparatus has been described fully and completely with special emphasis upon a single preferred embodiment, it should be understood that within the scope of the appended claims the invention may be practiced otherwise than as specifically described herein.

I claim:

1. A portable, wheeled, hand-moved agricultural sprayer capable of continuous operation comprising, in combination an elongated tubular metal frame having a push handle at one end and a pair of vertically extending tubular metal supports at the other end, a pair of wheels supported at one end portion of said frame, spray boom support means adjustably supported on said vertically extending supports and adapted to be supported at any predetermined position thereon, said boom support means comprising a pair of parallel, spaced support plates, means supporting said plates in spaced relation, means on one of said plates supporting said spray booms for pivotal movement thereon, the other of said plates having a pair of slots therein, said adjustable securing means being positioned in said slots and cooperating with said spray booms to support and secure the same in any predetermined pivotal position, a pair of hollow tubing spray booms pivotally supported on said boom support means and extending from opposite sides thereof, a plurality of spray nozzles supported on said hollow tubing spray booms, adjustable securing means on said boom support means cooperable with said spray booms to adjust and secure said booms independently in any predetermined pivotal position, a tank supported on said frame for carrying a liquid to be sprayed and operable under air pressure to produce a continuous spray of liquid, conduit means connecting said tank to said spray booms to supply liquid for spraying, an electrically driven compressor supported on said frame for supplying compressed air, conduit means connecting said compressor to said tank to maintain the same under air pressure for spraying, and an electric storage battery supported by said frame and connected to said electrically driven compressor.

2. An agricultural sprayer according to claim 1 in which said one supporting plate includes hollow supporting members cooperable with said vertical support tubes, and an adjustable clamp cooperable with said vertical support tubes to support said boom support means in a predetermined vertical position.

3. An agricultural sprayer according to claim 2 in which said spray nozzles are universally adjustable.

4. An agricultural sprayer according to claim 1 including valve means in said spray boom conduit means to control or shut off flow of liquid independently to said spray booms.

5. An agricultural sprayer according to claim 4 including quick disconnect means in said spray boom conduit means, and a check valve closed when said quick disconnect means is disconnected.

* * * * *